United States Patent
Gnüchtel et al.

(10) Patent No.: US 11,820,076 B2
(45) Date of Patent: Nov. 21, 2023

(54) 3D PRINTING PROCESS AND MOLDING PRODUCED BY THIS PROCESS USING LIGNOSULFATE

(71) Applicant: Voxeljet AG, Friedberg (DE)

(72) Inventors: Ingo Gnüchtel, Villenbach (DE); Florian Mögele, Gessertshausen-Döpshofen (DE)

(73) Assignee: VOXELJET AG, Friedberg (DE)

( * ) Notice: Subject to any disclaimer, the term of this patent is extended or adjusted under 35 U.S.C. 154(b) by 0 days.

(21) Appl. No.: 17/772,338

(22) PCT Filed: Oct. 29, 2020

(86) PCT No.: PCT/DE2020/000263
§ 371 (c)(1),
(2) Date: Apr. 27, 2022

(87) PCT Pub. No.: WO2021/083446
PCT Pub. Date: May 6, 2021

(65) Prior Publication Data
US 2022/0371267 A1   Nov. 24, 2022

(30) Foreign Application Priority Data
Nov. 1, 2019   (DE) .................. 10 2019 007 595.1

(51) Int. Cl.
| | |
|---|---|
| B29C 64/165 | (2017.01) |
| B33Y 10/00 | (2015.01) |
| B33Y 30/00 | (2015.01) |
| B33Y 70/00 | (2020.01) |
| B33Y 80/00 | (2015.01) |
| B29C 64/264 | (2017.01) |
| B29C 33/38 | (2006.01) |
| B29K 1/00 | (2006.01) |

(52) U.S. Cl.
CPC ........ B29C 64/165 (2017.08); B29C 33/3807 (2013.01); B29C 33/3814 (2013.01); B29C 33/3842 (2013.01); B29C 64/264 (2017.08); *B29K 2001/00* (2013.01); *B33Y 10/00* (2014.12); *B33Y 30/00* (2014.12); *B33Y 70/00* (2014.12); *B33Y 80/00* (2014.12)

(58) Field of Classification Search
CPC ....... B29C 64/165; B22F 10/14; B33Y 10/00; B33Y 30/00; B33Y 70/00; B33Y 80/00
See application file for complete search history.

(56) References Cited

U.S. PATENT DOCUMENTS

| | | |
|---|---|---|
| 4,247,508 A | 1/1981 | Housholder |
| 4,575,330 A | 3/1986 | Hull |
| 4,665,492 A | 5/1987 | Masters |
| 4,752,352 A | 6/1988 | Feygin |
| 4,752,498 A | 6/1988 | Fudim |
| 4,944,817 A | 7/1990 | Bourell et al. |
| 5,017,753 A | 5/1991 | Deckard |
| 5,031,120 A | 7/1991 | Pomerantz et al. |
| 5,047,182 A | 9/1991 | Sundback et al. |
| 5,059,266 A | 10/1991 | Yamane et al. |
| 5,120,476 A | 6/1992 | Scholz |
| 5,126,529 A | 6/1992 | Weiss et al. |
| 5,127,037 A | 6/1992 | Bynum |
| 5,134,569 A | 7/1992 | Masters |
| 5,136,515 A | 8/1992 | Helinski |
| 5,149,548 A | 9/1992 | Yamane et al. |
| 5,155,324 A | 10/1992 | Deckard et al. |
| 5,156,697 A | 10/1992 | Bourell et al. |
| 5,248,456 A | 8/1993 | Evans, Jr. et al. |
| 5,252,264 A | 10/1993 | Forderhase et al. |
| 5,284,695 A | 2/1994 | Barlow et al. |
| 5,342,919 A | 8/1994 | Dickens, Jr. et al. |
| 5,352,405 A | 10/1994 | Beaman et al. |
| 5,387,380 A | 2/1995 | Cima et al. |
| 5,398,193 A | 3/1995 | deAngelis |
| 5,503,785 A | 4/1996 | Crump et al. |
| 5,518,060 A | 5/1996 | Cleary et al. |
| 5,518,680 A | 5/1996 | Cima et al. |
| 5,555,176 A | 9/1996 | Menhennett et al. |
| 5,637,175 A | 6/1997 | Feygin et al. |
| 5,639,070 A | 6/1997 | Deckard |
| 5,639,402 A | 6/1997 | Barlow et al. |
| 5,647,931 A | 7/1997 | Retallick et al. |
| 5,658,412 A | 8/1997 | Retallick et al. |
| 5,665,401 A | 9/1997 | Serbin et al. |
| 5,717,599 A | 2/1998 | Menhennett et al. |
| 5,730,925 A | 3/1998 | Mattes et al. |

(Continued)

FOREIGN PATENT DOCUMENTS

| | | |
|---|---|---|
| AU | 720255 B2 | 5/2000 |
| CN | 101146666 A | 3/2008 |

(Continued)

OTHER PUBLICATIONS

US 4,937,420 A, 06/1990, Deckard (withdrawn)
International Search Report & Written Opinion for PCT Application No. PCT/DE2020/000263 dated Feb. 22, 2021.
Armin Scharf, "Erster 3D-Endlosdrucker", zwomp.de, http://www.zwomp.de/2012/11/06/Voxeljet-endlosdrucker/ dated Nov. 6, 2012.
Cima et al., "Computer-derived Microstructures by 3D Printing: Bio- and Structural Materials," SFF Symposium, Austin, TX, 1994.
EOS Operating Manual for Laser Sintering Machine with Brief Summary Feb. 22, 2005.
Feature Article—Rapid Tooling—Cast Resin and Sprayed Metal Tooling by Joel Segal, Apr. 2000.

(Continued)

*Primary Examiner* — Mary Lynn F Theisen
(74) *Attorney, Agent, or Firm* — The Dobrusin Law Firm, P.C.

(57) ABSTRACT

The present invention relates to a material system for 3D printing, to a 3D printing process using a lignin-containing component or derivatives thereof or modified lignins, to soluble moldings that are produced by a powder-based additive layer manufacturing process and to the use of the moldings.

21 Claims, 5 Drawing Sheets

(56) References Cited

U.S. PATENT DOCUMENTS

| | | |
|---|---|---|
| 5,740,051 A | 4/1998 | Sanders, Jr. et al. |
| 5,749,041 A | 5/1998 | Lakshminarayan et al. |
| 5,753,274 A | 5/1998 | Wilkening et al. |
| 5,824,250 A | 10/1998 | Whalen |
| 5,851,465 A | 12/1998 | Bredt |
| 5,884,688 A | 3/1999 | Hinton et al. |
| 5,902,537 A | 5/1999 | Almquist et al. |
| 5,934,343 A | 8/1999 | Gaylo et al. |
| 5,940,674 A | 8/1999 | Sachs et al. |
| 5,943,235 A | 8/1999 | Earl et al. |
| 5,989,476 A | 11/1999 | Lockard et al. |
| 6,048,188 A | 4/2000 | Hull et al. |
| 6,048,954 A | 4/2000 | Barlow et al. |
| 6,146,567 A | 11/2000 | Sachs et al. |
| 6,147,138 A | 11/2000 | Hochsmann et al. |
| 6,155,331 A | 12/2000 | Langer et al. |
| 6,164,850 A | 12/2000 | Speakman |
| 6,165,406 A | 12/2000 | Jang et al. |
| 6,169,605 B1 | 1/2001 | Penn et al. |
| 6,193,922 B1 | 2/2001 | Ederer |
| 6,210,625 B1 | 4/2001 | Matsushita |
| 6,217,816 B1 | 4/2001 | Tang |
| 6,243,616 B1 | 6/2001 | Droscher et al. |
| 6,259,962 B1 | 7/2001 | Gothait |
| 6,270,335 B2 | 8/2001 | Leyden et al. |
| 6,305,769 B1 | 10/2001 | Thayer et al. |
| 6,335,097 B1 | 1/2002 | Otsuka et al. |
| 6,375,874 B1 | 4/2002 | Russell et al. |
| 6,403,002 B1 | 6/2002 | Van Der Geest |
| 6,405,095 B1 | 6/2002 | Jang et al. |
| 6,423,255 B1 | 7/2002 | Hoechsmann et al. |
| 6,500,378 B1 | 12/2002 | Smith |
| 6,554,600 B1 | 4/2003 | Hofmann et al. |
| 6,596,224 B1 | 7/2003 | Sachs et al. |
| 6,658,314 B1 | 12/2003 | Gothait |
| 6,672,343 B1 | 1/2004 | Perret et al. |
| 6,713,125 B1 | 3/2004 | Sherwood et al. |
| 6,722,872 B1 | 4/2004 | Swanson et al. |
| 6,733,528 B2 | 5/2004 | Abe et al. |
| 6,827,988 B2 | 12/2004 | Krause et al. |
| 6,830,643 B1 | 12/2004 | Hayes |
| 6,838,035 B1 | 1/2005 | Ederer et al. |
| 6,896,839 B2 | 5/2005 | Kubo et al. |
| 7,120,512 B2 | 10/2006 | Kramer et al. |
| 7,153,463 B2 | 12/2006 | Leuterer et al. |
| 7,291,002 B2 | 11/2007 | Russell et al. |
| 7,296,990 B2 | 11/2007 | Devos et al. |
| 7,332,537 B2 | 2/2008 | Bredt et al. |
| 7,348,075 B2 | 3/2008 | Farr et al. |
| 7,378,052 B2 | 5/2008 | Harryson |
| 7,455,805 B2 | 11/2008 | Oriakhi et al. |
| 7,497,977 B2 | 3/2009 | Nielsen et al. |
| 7,597,835 B2 | 10/2009 | Marsac |
| 7,641,461 B2 | 1/2010 | Khoshnevis |
| 7,790,096 B2 | 9/2010 | Merot et al. |
| 7,799,253 B2 | 9/2010 | Höchsmann et al. |
| 8,186,415 B2 | 5/2012 | Marutani et al. |
| 8,574,485 B2 | 11/2013 | Kramer |
| 8,951,033 B2 | 2/2015 | Höchsmann et al. |
| 9,327,450 B2 | 5/2016 | Hein et al. |
| 2001/0045678 A1 | 11/2001 | Kubo et al. |
| 2001/0050031 A1 | 12/2001 | Bredt et al. |
| 2002/0015783 A1 | 2/2002 | Harvey |
| 2002/0016387 A1 | 2/2002 | Shen |
| 2002/0026982 A1 | 3/2002 | Bredt et al. |
| 2002/0079601 A1 | 6/2002 | Russell et al. |
| 2002/0090410 A1 | 7/2002 | Tochimoto et al. |
| 2002/0111707 A1 | 8/2002 | Li et al. |
| 2002/0155254 A1 | 10/2002 | McQuate et al. |
| 2002/0167100 A1 | 11/2002 | Moszner et al. |
| 2003/0004599 A1 | 1/2003 | Herbak |
| 2003/0083771 A1 | 5/2003 | Schmidt |
| 2003/0114936 A1 | 6/2003 | Sherwood et al. |
| 2004/0003738 A1 | 1/2004 | Imiolek et al. |
| 2004/0012112 A1 | 1/2004 | Davidson et al. |
| 2004/0025905 A1 | 2/2004 | Ederer et al. |
| 2004/0026418 A1 | 2/2004 | Ederer et al. |
| 2004/0035542 A1 | 2/2004 | Ederer et al. |
| 2004/0036200 A1 | 2/2004 | Patel et al. |
| 2004/0038009 A1 | 2/2004 | Leyden et al. |
| 2004/0045941 A1 | 3/2004 | Herzog et al. |
| 2004/0056378 A1 | 3/2004 | Bredt et al. |
| 2004/0094058 A1 | 5/2004 | Kasperchik et al. |
| 2004/0112523 A1 | 6/2004 | Crom |
| 2004/0145088 A1 | 7/2004 | Patel et al. |
| 2004/0170765 A1 | 9/2004 | Ederer et al. |
| 2004/0187714 A1 | 9/2004 | Napadensky et al. |
| 2004/0207123 A1 | 10/2004 | Patel et al. |
| 2004/0239009 A1 | 12/2004 | Collins et al. |
| 2005/0003189 A1 | 1/2005 | Bredt et al. |
| 2005/0017386 A1 | 1/2005 | Harrysson |
| 2005/0017394 A1 | 1/2005 | Hochsmann et al. |
| 2005/0074511 A1 | 4/2005 | Oriakhi et al. |
| 2005/0079086 A1 | 4/2005 | Farr |
| 2005/0093194 A1 | 5/2005 | Oriakhi et al. |
| 2005/0167872 A1 | 8/2005 | Tsubaki et al. |
| 2005/0174407 A1 | 8/2005 | Johnson et al. |
| 2005/0179167 A1 | 8/2005 | Hachikian |
| 2005/0212163 A1 | 9/2005 | Bausinger et al. |
| 2005/0218549 A1 | 10/2005 | Farr et al. |
| 2005/0276976 A1 | 12/2005 | Pfeifer et al. |
| 2005/0280185 A1 | 12/2005 | Russell et al. |
| 2006/0012058 A1 | 1/2006 | Hasei |
| 2006/0103054 A1 | 5/2006 | Pfeifer et al. |
| 2006/0105102 A1 | 5/2006 | Hochsmann et al. |
| 2006/0159896 A1 | 7/2006 | Pfeifer et al. |
| 2006/0175346 A1 | 8/2006 | Ederer et al. |
| 2006/0180957 A1 | 8/2006 | Hopkinson et al. |
| 2006/0208388 A1 | 9/2006 | Bredt et al. |
| 2006/0237159 A1 | 10/2006 | Hochsmann |
| 2006/0251535 A1 | 11/2006 | Pfeifer et al. |
| 2006/0254467 A1 | 11/2006 | Farr et al. |
| 2006/0257579 A1 | 11/2006 | Farr et al. |
| 2007/0045891 A1 | 3/2007 | Martinoni |
| 2007/0057412 A1 | 3/2007 | Weiskopf et al. |
| 2007/0126157 A1 | 6/2007 | Bredt |
| 2007/0238056 A1 | 10/2007 | Baumann et al. |
| 2007/0241482 A1 | 10/2007 | Giller et al. |
| 2008/0001331 A1 | 1/2008 | Ederer |
| 2008/0003390 A1 | 1/2008 | Hayashi |
| 2008/0018018 A1 | 1/2008 | Nielsen et al. |
| 2008/0047628 A1 | 2/2008 | Davidson et al. |
| 2008/0138515 A1 | 6/2008 | Williams |
| 2008/0187711 A1 | 8/2008 | Alam et al. |
| 2008/0233302 A1 | 9/2008 | Elsner et al. |
| 2008/0241404 A1 | 10/2008 | Allaman et al. |
| 2008/0260945 A1 | 10/2008 | Ederer et al. |
| 2008/0299321 A1 | 12/2008 | Ishihara |
| 2009/0068376 A1 | 3/2009 | Philippi et al. |
| 2010/0007048 A1 | 1/2010 | Schweininger |
| 2010/0007062 A1 | 1/2010 | Larsson et al. |
| 2010/0207288 A1 | 8/2010 | Dini |
| 2010/0212584 A1 | 8/2010 | Ederer et al. |
| 2010/0244301 A1 | 9/2010 | Ederer et al. |
| 2010/0247742 A1 | 9/2010 | Shi et al. |
| 2010/0272519 A1 | 10/2010 | Ederer et al. |
| 2010/0279007 A1 | 11/2010 | Briselden et al. |
| 2010/0291314 A1 | 11/2010 | Kashani-Shirazi |
| 2010/0323301 A1 | 12/2010 | Tang |
| 2011/0049739 A1 | 3/2011 | Uckelmann et al. |
| 2011/0059247 A1 | 3/2011 | Kuzusako et al. |
| 2011/0177188 A1 | 7/2011 | Bredt et al. |
| 2011/0223437 A1 | 9/2011 | Ederer et al. |
| 2012/0046779 A1 | 2/2012 | Pax et al. |
| 2012/0057143 A1 | 3/2012 | Jamar et al. |
| 2012/0097258 A1 | 4/2012 | Hartmann et al. |
| 2012/0113439 A1 | 5/2012 | Ederer et al. |
| 2012/0126457 A1 | 5/2012 | Abe et al. |
| 2012/0291701 A1 | 11/2012 | Grasegger et al. |
| 2013/0000549 A1 | 1/2013 | Hartmann et al. |
| 2013/0004610 A1 | 1/2013 | Hartmann et al. |
| 2013/0026680 A1 | 1/2013 | Ederer et al. |
| 2013/0029001 A1 | 1/2013 | Gunther et al. |
| 2013/0052291 A1 | 2/2013 | Morikawa |

(56) References Cited

U.S. PATENT DOCUMENTS

| | | | |
|---|---|---|---|
| 2013/0199444 | A1 | 8/2013 | Hartmann |
| 2013/0234355 | A1 | 9/2013 | Hartmann et al. |
| 2013/0302575 | A1 | 11/2013 | Mogele et al. |
| 2014/0048980 | A1 | 2/2014 | Crump et al. |
| 2014/0065194 | A1 | 3/2014 | Yoo et al. |
| 2014/0212677 | A1 | 7/2014 | Gnuchtel et al. |
| 2014/0227123 | A1 | 8/2014 | Gunster |
| 2014/0252672 | A1* | 9/2014 | Rael ............... C04B 14/005 106/804 |
| 2014/0271961 | A1 | 9/2014 | Khoshnevis |
| 2014/0306379 | A1 | 10/2014 | Hartmann et al. |
| 2015/0042018 | A1 | 2/2015 | Gunther et al. |
| 2015/0110910 | A1 | 4/2015 | Hartmann et al. |
| 2015/0224718 | A1 | 8/2015 | Ederer et al. |
| 2015/0266238 | A1 | 9/2015 | Ederer et al. |
| 2015/0273572 | A1 | 10/2015 | Ederer et al. |
| 2015/0290881 | A1 | 10/2015 | Ederer et al. |
| 2015/0375419 | A1 | 12/2015 | Gunther et al. |
| 2016/0001506 | A1* | 1/2016 | Hirata ............... C08K 3/34 106/172.1 |
| 2016/0236422 | A1 | 8/2016 | Sakura |
| 2016/0263828 | A1 | 9/2016 | Ederer et al. |
| 2016/0303762 | A1 | 10/2016 | Gunther |
| 2016/0311167 | A1 | 10/2016 | Gunther et al. |
| 2016/0311210 | A1 | 10/2016 | Gunther et al. |
| 2016/0318251 | A1 | 11/2016 | Ederer et al. |
| 2016/0339644 | A1 | 11/2016 | Sobue et al. |
| 2017/0050378 | A1 | 2/2017 | Ederer |
| 2017/0072463 | A1 | 3/2017 | Ng et al. |
| 2017/0080607 | A1 | 3/2017 | Sahara et al. |
| 2017/0106595 | A1 | 4/2017 | Gunther et al. |
| 2017/0151722 | A1 | 6/2017 | Prasad et al. |
| 2017/0151727 | A1 | 6/2017 | Ederer et al. |
| 2017/0157852 | A1 | 6/2017 | Ederer et al. |
| 2017/0182711 | A1 | 6/2017 | Gunther et al. |
| 2017/0210037 | A1 | 7/2017 | Ederer et al. |
| 2017/0297263 | A1 | 10/2017 | Ederer et al. |
| 2017/0305139 | A1 | 10/2017 | Hartmann |
| 2017/0355137 | A1 | 12/2017 | Ederer et al. |
| 2018/0017957 | A1 | 1/2018 | Morovic et al. |
| 2018/0022923 | A1 | 1/2018 | Emamjomeh et al. |
| 2018/0056393 | A1 | 3/2018 | Herzog et al. |
| 2018/0065297 | A1 | 3/2018 | Zhao et al. |
| 2018/0079133 | A1 | 3/2018 | Ederer et al. |
| 2018/0141271 | A1 | 5/2018 | Gunther et al. |
| 2018/0193887 | A1 | 7/2018 | Pourcher et al. |
| 2018/0243883 | A1 | 8/2018 | Brandl |
| 2018/0297284 | A1 | 10/2018 | Fulop et al. |
| 2018/0326662 | A1 | 11/2018 | Gunther et al. |
| 2018/0369910 | A1 | 12/2018 | Gunther et al. |
| 2019/0047218 | A1 | 2/2019 | Ederer et al. |
| 2019/0084229 | A1 | 3/2019 | Gunther |
| 2019/0126555 | A1 | 5/2019 | Lebed |
| 2019/0126607 | A1 | 5/2019 | De Pena et al. |
| 2019/0160531 | A1* | 5/2019 | Yoo ............... B29C 64/165 |
| 2019/0160751 | A1 | 5/2019 | Huang et al. |
| 2020/0004215 | A1 | 1/2020 | Ramirez et al. |
| 2020/0055246 | A1 | 2/2020 | Gunther et al. |
| 2020/0122356 | A1* | 4/2020 | Hideshima ............... B22F 10/28 |
| 2020/0130263 | A1 | 4/2020 | Gunther et al. |
| 2020/0189259 | A1 | 6/2020 | Hartmann et al. |
| 2020/0262141 | A1 | 8/2020 | Ederer et al. |
| 2021/0316507 | A1 | 10/2021 | Grasegger et al. |
| 2022/0219289 | A1 | 7/2022 | Griesser et al. |
| 2022/0258412 | A1 | 8/2022 | Scheck et al. |
| 2022/0288849 | A1 | 9/2022 | Ederer et al. |
| 2022/0363000 | A1 | 11/2022 | Heymel et al. |
| 2022/0371267 | A1 | 11/2022 | Gnuchtel et al. |
| 2022/0379553 | A1 | 12/2022 | Hoppmann et al. |
| 2022/0402203 | A1 | 12/2022 | Scheck et al. |
| 2022/0402209 | A1 | 12/2022 | Heymel et al. |

FOREIGN PATENT DOCUMENTS

| | | |
|---|---|---|
| CN | 106187056 A | 12/2016 |
| CN | 108484041 A | 9/2018 |
| CN | 11014258 A | 8/2019 |
| DE | 3221357 A1 | 12/1983 |
| DE | 3930750 C2 | 3/1991 |
| DE | 4102260 A1 | 7/1992 |
| DE | 4305201 C1 | 4/1994 |
| DE | 4 325 573 A1 | 2/1995 |
| DE | 29506204 U1 | 6/1995 |
| DE | 4440397 | 9/1995 |
| DE | 19530295 C1 | 1/1997 |
| DE | 19528215 A1 | 2/1997 |
| DE | 29701279 U1 | 5/1997 |
| DE | 19545167 A1 | 6/1997 |
| DE | 69031808 T2 | 4/1998 |
| DE | 19853834 | 5/2000 |
| DE | 63634921 T2 | 12/2005 |
| DE | 201 22 639 U1 | 11/2006 |
| DE | 102006040305 A1 | 3/2007 |
| DE | 102006029298 A1 | 12/2007 |
| DE | 102007040755 A1 | 3/2009 |
| DE | 102007047326 A1 | 4/2009 |
| DE | 102011053205 A1 | 3/2013 |
| DE | 202016003042 U1 | 7/2016 |
| DE | 102017200773 A1 | 7/2018 |
| EP | 0361847 B1 | 4/1990 |
| EP | 0431924 B1 | 1/1996 |
| EP | 1415792 | 5/2004 |
| EP | 1457590 A1 | 9/2004 |
| EP | 2202016 A1 | 6/2010 |
| EP | 3202534 A1 | 8/2017 |
| GB | 2297516 A | 8/1996 |
| GB | 2575544 A | 1/2020 |
| JP | S62275734 A | 11/1987 |
| JP | 2003/136605 A | 5/2003 |
| JP | 2004/082206 A | 3/2004 |
| JP | 2009/202451 A | 9/2009 |
| WO | 90/03893 A1 | 4/1990 |
| WO | 2004/014637 A1 | 2/2004 |
| WO | 2006/100166 A1 | 9/2006 |
| WO | 01/40866 A2 | 6/2007 |
| WO | 2008/049384 A1 | 5/2008 |
| WO | 2008/061520 A2 | 5/2008 |
| WO | 2011/063786 A1 | 6/2011 |
| WO | 2013/075696 A1 | 5/2013 |
| WO | 2014/090207 A1 | 6/2014 |
| WO | 2014/166469 A1 | 10/2014 |
| WO | 2016/019942 A1 | 2/2016 |
| WO | 2017/008777 A1 | 1/2017 |
| WO | 2019/027404 A1 | 2/2019 |
| WO | 2019160405 A1 | 8/2019 |

OTHER PUBLICATIONS

Gebhalt, Rapid Prototyping, pp. 118-119, 1996.

International Preliminary Report on Patentability, PCT Application No. PCT/DE2020/000263, dated May 3, 2022.

Jacobs et al., 2005 SME Technical Paper, title "Are QuickCast Patterns Suitable for Limited Production?"

Marcus et al., Solid Freedom Fabrication Proceedings, Nov. 1993.

Marcus, et al., Solid Freeform Fabrication Proceedings, Sep. 1995, pp. 130-133.

Sachs et al., "Three-Dimensional Printing: Rapid Tooling and Prototypes Directly from a CAD Model", Massachusetts Institute of Technology, pp. 143-151, Jan. 1990.

Sachs, E., P. Williams, D. Brancazio, M. Cima, and K. Kremmin, Three dimensional printing: Rapid Tooling and Prototypes Directly from a CAD Model. In Proceedings of Manufacturing International 1990 (Atlanta, GA, Mar. 25-28). ASME, New York, 1990, pp. 131-136.

Screen shots of URL: http://www.youtube.com/watch?v=hgIrNXZjIxU taken in approximately 5 second intervals on Nov. 12, 2015.

(56) References Cited

OTHER PUBLICATIONS

Williams, "Feasibility Study of Investment Casting Pattern Design by Means of Three Dimensional Printing", Department of Mechanical Engineering, abstract only; Sep. 25, 2001.

* cited by examiner

3D PRINTING PROCESS AND MOLDING PRODUCED BY THIS PROCESS USING LIGNOSULFATE

FIELD

The present invention relates to a material system for 3D printing, to a 3D printing process using a lignin-containing component or derivatives thereof, to soluble moldings that are produced by a powder-based additive layer manufacturing process, and to the use of the moldings.

BACKGROUND

European Patent EP 0 431 924 B1 describes a process for producing three-dimensional objects based on computer data. In the process, a thin layer of particle material is deposited on a platform and has a liquid selectively printed thereon by means of a print head. In the area printed with the liquid, the particles become bonded and the area solidifies under the influence of the liquid and, if necessary, an additional hardener. Next, the platform is lowered by one layer thickness in a building cylinder and provided with a new layer of particle material, the latter also being printed on as described above. These steps are repeated until a certain desired height of the object is achieved. Thus, the printed and solidified regions form a three-dimensional object.

This method allows the processing of different particle materials, including—as a non-exhaustive example—natural biological raw materials, polymeric plastic materials, metals, ceramics and sands.

Sand particles, for example, can be processed with binder systems through powder-based 3D printing. These include cold resin bonding, which is used in foundry applications as well as in 3D printing.

Inorganic binders are also used in this field. In the foundry industry, they are the environmentally friendly alternative to cold resin binders.

These materials are particularly suitable for metal casting, where high temperatures usually prevail and where the organic binder burns to a large extent and pre-weakens the mold. In the subsequent step, after the melt has cooled, the mold residues are removed mechanically. In the case of inorganically bonded molds, high energies must be applied to prevent weakening of the mold during casting.

For cold casting with synthetic resins or hydraulically setting systems such as concrete, none of the previously mentioned molds are weakened. The surface of the sand molds must be coated and sealed prior to cold casting and a release agent must be applied to facilitate the separation of the interfaces after the casting material has cured.

While outer molds can still be removed from the mold, it is disadvantageously not possible to produce inner structures of the casting with insert cores, since mechanical removal of the insert core is practically impossible without damaging the final mold.

The situation is similarly disadvantageous when using the printed sand molds as a laminating tool. Simple surface textures can be easily produced on coated surfaces, but this is not possible for undercuts or overhangs. While it is still possible, with certain geometries, to mechanically destroy the mold and thus expose the laminate, this is impossible with almost closed structures and will damage the laminate.

Thus, no or only insufficiently satisfactory processes are known to date that make it possible to produce complicated laminated moldings. However, satisfactory processes and material systems for 3D printing are not available for both laminated moldings and cold casting molds with complicated geometries, such as undercuts.

It was therefore an object of the present invention to eliminate or at least substantially reduce the disadvantages of the prior art.

It was an object of the present invention to provide a material system and/or a 3D printing process that reduces or completely avoids the disadvantages of the prior art.

It was an object of the present invention to provide a material system and/or a 3D printing process that allows complicated geometries and laminated parts to be produced in a simple and cost-effective manner.

SUMMARY OF THE INVENTION

In one aspect, the invention relates to a material system comprising a particle material or a mixture and a printing liquid.

In another aspect, the invention relates to a process of producing moldings that can be used as a laminating mold or cold casting mold and that can be easily removed by washing out with an aqueous solution or liquid, if necessary.

DETAILED DESCRIPTION

A solution to the object underlying the invention in cold casting as well as in the production of laminates is a material system and/or a process for the production of 3D printed moldings, wherein a lignin or derivatives thereof are contained in the printing liquid, which moldings can preferably be demolded with the aid of a solvent such as water with destruction.

n one aspect, a solution is provided by a material system suitable for a 3D printing process or a 3D printing process material system comprising or consisting of a particle material and a printing liquid, wherein the particle material is selected from the group consisting of inorganic particle materials such as quartz sand, olivine sand, kerphalite, cerabeads, ceramics, metal powder or other organic particle materials such as wood powder, starch powder or cellulose powder, the particle material preferably being untreated, wherein the printing liquid comprises or consists of a liquid selected from the group consisting of water or an aqueous solution and a lignin-containing component or derivatives thereof, preferably lignosulfonate.

One of the advantages of the material system according to the invention is that it is cost-effective, since either inexpensive insoluble materials can be used or/and the insoluble particle material can be substantially reused. This is particularly advantageous in the case of expensive particle materials. Furthermore, lignin is a renewable raw material that is readily available and also inexpensive Moreover, the printing liquid is easy to handle, environmentally compatible and gentle on the print head and its components, which represent a significant cost factor in 3D printing machines and their processes In a material system according to the invention, the printing liquid may additionally include or comprise a component selected from the group consisting of water-soluble plastics such as polyvinyl pyrrolidone, polyethylene glycol, polyvinyl alcohol or polyacrylic acid, or other known water-soluble components that are compatible with the other material components.

In a material system according to the invention, the ratio of the individual components to one another is adjusted in such a way that a 3D printing process can be advantageously carried out and leads to the desired properties of the moldings produced.

In one aspect of the material system according to the invention, the printing liquid is equally adjusted and adapted to the other material components, wherein the printing liquid may consist of or comprise polar organic or/and inorganic fluids, preferably water and/or alcohols.

In a further aspect, the material system according to the invention is characterized in that the printing liquid consists of or comprises polar organic or/and inorganic liquids, preferably water and/or alcohols.

Preferably, the material system may be characterized in that it additionally contains a soluble starch hydrolysate, e.g. maltodextrin, glucose, preferably wherein the dextrose equivalent of the starch hydrolysate is between 1 and 50, preferably between 3 and 35, particularly preferably between 3 and 20.

In another aspect, the components of the material system can be adjusted differently in their ratio to each other. The lignin content in a printing fluid according to the disclosure may be between 10-35% (always based on the total mixture), preferably 10-25%, more preferably 15-20%; a starch hydrolysate may be present individually or in a mixture of several components in a proportion of between 10-35% (always based on the total mixture), preferably 10-25%, more preferably 15-20%; dispersing additives or/and surfactants may be present from between 0-3% (always based on the total mixture), preferably 0.1-1% may be present.

In a material system according to the invention, the alcohol content may be between 0.5%-15%, preferably 2%-10%, particularly preferably 5%-8% and/or wherein the alcohols comprise simple alcohols, diols or polyols or mixtures of the above.

In a material system according to the invention, the printing liquid is adjusted with regard to its viscosity in a suitable manner using suitable substances or liquids known to the skilled person. The viscosity can be between 2 mPas-20 mPas, preferably between 8 mPas-15 mPas and particularly preferably between 10 mPas-14 mPas.

In a material system according to the invention, the printing liquid may further comprise surfactants, such as sodium dodecyl sulfate or sodium laureth sulfate, and have a surface tension of 20 mN/m-50 mN/m, preferably 25 mN/m-40 mN/m and particularly preferably 28 mN/m-35 mN/m, or/and defoaming agents from, for example, the group of siloxanes or/and dyes.

In another aspect, the invention relates to a 3D printing process for producing a molding, said process comprising the steps of applying a particle material mixture onto a build plane, selectively applying a printing liquid, wherein the printing liquid comprises or consists of a liquid selected from the group consisting of water or an aqueous solution and a lignin-containing component or derivatives thereof, preferably lignosulfonate, for at least partial selective solidification, optionally tempering the build field or introducing energy into the applied particle material mixture, preferably tempering to 30° C. to 60° C., more preferably 40° C. to 50° C., and the printing liquid, repeating these steps until the desired molding has been obtained.

The advantage of this process is that moldings can be produced in good quality and can be used in a variety of applications and uses.

In particular, one advantage is that the moldings (also molds or casting molds) produced in this way can serve as laminating molds or for all purposes where the mold is to be removed again at the end of the process for which they are used. This can be done simply by adding water, which washes out the mold, allowing the product made with the mold to be gently freed from the mold.

In a 3D printing process according to the invention, the obtained molding can be separated from the non-solidified particle material mixture and the molding can preferably be subjected to a further heat treatment step.

As in all common 3D printing processes, e.g. inkjet processes, the particle material mixture is applied by means of recoaters and, if necessary, the particle material mixture is mixed before application.

As in all common 3D printing processes, e.g. inkjet processes, the printing liquid is selectively applied with a print head.

In a 3D printing process according to the invention, the molding can be left in the powder bed at ambient conditions for 4 h-24 h, preferably 8 h-15 h, particularly preferably 10 h-11 h, after completion of the printing process.

The 3D printing process according to the invention can be followed by further procedures. For example, in an additional step, the molding is subjected to heat treatment, preferably the molding is stored 1 h-7 h, preferably 4 h-6 h, at 30° C.-160° C., preferably at 50° C.-140° C.

In the 3D printing process according to the invention, air can be sucked through the printed and non-printed build volume to increase unpacking strength. Suction is preferably started 0.5 h-8 h after completion of mold production (end of job), preferably 1 h-5 h, particularly preferably 1 h-3 h after completion of the building process. The air sucked through may have a temperature that varies from room temperature, the air sucked through preferably having a temperature of 10° C.-80° C., preferably 15° C.-60° C., particularly preferably 20° C.-40° C. Suction is applied, preferably for 0.5 h-3 h, and particularly preferably for 1 h-2 h. A downstream heating process of the parts in the oven can be carried out additionally to further increase the strength. Preferably, the molding is stored for 1 h-7 h, preferably 4 h-6 h, at 30° C.-160° C., preferably at 50° C.-140° C. Post-treatment can also be carried out with microwave radiation in addition to or as a substitute for the heat treatment in the oven, the treatment taking place over a period of 2 min-30 min, preferably 2 min-15 min, particularly preferably 2 min-10 min.

Another possibility of a subsequent step in a 3D printing process according to the invention is to further coat or seal the surface of the molding, in which case all processes and materials known to the skilled person can be used here for such moldings.

The moldings produced by the 3D printing process of the invention can be used in a wide variety of applications, e.g. in lamination processes for the production of tubes or hoses for aerospace or similar applications.

The material properties of the moldings produced by the 3D process according to the invention are advantageous and can be further influenced in certain material properties by suitable subsequent steps of the process. For example, on the one hand, strength can be influenced by the amount of water-soluble component in the printing liquid and the amount of printing liquid applied to the particle material, and on the other hand, strength can be adjusted by leaving the molding in the powder bed or by a subsequent heat treatment, as well as by allowing air to pass through by suction. A molding left in the powder bed for a further 4 h-24 h, preferably 8 h-15 h, particularly preferably 10 h-11 h, at ambient conditions can exhibit strengths of 80 N/cm$^2$-150 N/cm$^2$ in the direction of printing. Due to the air passing through by suction, said strength is achieved after a shorter time. After heat treatment for 1 h-7 h, preferably 4 h-6 h, at 30° C.-160° C., preferably at 50° C.-140° C., strengths of more than 200 N/cm$^2$ may result.

In a further aspect, the invention relates to the use of a molding produced according to the invention or produced by a process according to the invention for cold casting of synthetic resins or hydraulically setting systems or as a laminating mold.

Other aspects of the invention will be described below.

Prior to the actual 3D printing process according to the invention, the inert particle material, such as the sands already known to be used in powder bed-based 3D printing, such as quartz sand, olivine sand, kerphalite or cerabeads, but also insoluble plastics, need not be mixed with further soluble organic substances.

The advantage of the above particle materials is that no changes to existing recoater technology are required and standard 3D printers capable of processing particle material in furan resin, phenolic resin and inorganic processes can be used.

In the case of mixtures of particle materials, the particle sizes are preferably between 90 μm and 250 μm, although finer powders are also suitable. This largely prevents segregation during transport of the particle material.

Mixed powders are usually already homogenized upstream of the process in a discontinuous mixer.

The liquid second component, i.e. a printing liquid, is introduced via a print head which is guided in a meandering manner over the coated first component, selectively according to the data of the respective layer pattern with a previously defined entry related to the weight of the particle material.

The printing liquid (the liquid component) consists largely of a solvent (dissolvent) that transfers the soluble material to the particle material. Preferably, the solvent is water.

To ensure that water can be processed in a pressure-stable manner, on the one hand the surface tension is lowered from about 72 mN/m to preferably below 40 mN/m, particularly preferably between 30 mN/m and 35 mN/m, by adding a surfactant. Only small quantities are added for this purpose, since high quantities promote foam formation and can lead to nozzle failures during printing. For this reason, only amounts up to 1% of a surfactant such as sodium dodecyl sulfate, sugar-based surfactants, SURFYNOL® 440 surfactant, SURFYNOL® 465 surfactant, CARBOWET® 104 surfactant are added to the printing liquid.

The occurrence of foam is reduced by adding defoaming agents, e.g. from the group of siloxanes such as TECO® FOAMEX 1488 defoamer, and usually adding up to 0.5% of the printing liquid.

The viscosity of the printing liquid is adjusted to a range of 4 mPas-20 mPas by adding readily water-soluble alcohols. Preferably, polyhydric alcohols such as glycol, propylene glycol, polyethylene glycol, polyvinyl alcohol or soluble sugars are used, their content being up to 20%. Particularly preferably, maltodextrin is added in an amount of 15%-20%, resulting in a viscosity of 11 mPas-15 mPas.

Furthermore, the dark, brown coloration of the printing liquid can be adjusted in its coloration by adding suitable dyes. Typically, small amounts of a readily soluble dye such as Basacide®, Orasole® or polymer dyes such as Milliken Red 17 are used. Amounts typically added are in the range of 0.1%-0.5%, preferably 0.2%-0.3%.

After printing the layer, the build platform is moved relative to the printing unit by one layer thickness and new powder material is applied.

In this case, an infrared lamp, which is located on the recoater axis and/or has a separate axis and/or is mounted on the print head axis, can heat the printed and/or the freshly applied layer by passing over the latter once or several times. The increased temperature helps to reduce the amount of liquid again by evaporation. In addition to increasing the strength of the parts, the heating step also advantageously produces a higher contour sharpness, since the diffusion of the binder is reduced by the aforementioned processes.

The surface temperature during the process is between 30° C. and 60° C., preferably 40° C.-50° C.

After completion of the build process, another 3 mm-30 mm, preferably 10 mm, of empty layers are applied to completely embed the last built parts in loose material.

After a waiting time of 4 h-24 h, preferably 8 h-12 h, and particularly preferably 10 h-11 h, the part can be freed from loose material, for example by means of a suction device. The unbonded powder can be returned to the process after control screening.

Finally, the parts are freed of any remaining adhering material using compressed air. The strengths of 80 N/cm$^2$-150 N/cm$^2$ are rather weak but strong enough to handle them without destruction or deformation.

Strength increase can be generated by post-treatment in the oven at preferably 100° C.-140° C. for 3 h-5 h, reaching final strengths of >200 N/cm$^2$.

Since the 3D printed moldings have a porous surface, it is usually advantageous to treat the surface of the printed part before using it as a casting or laminating mold. This reduces the porosity at the interface to such an extent that, in the further application step, the surface of the printed material can no longer be penetrated and the cast or laminate can be delineated from the printed part. The built mold is assembled or inserted into conventionally manufactured outer molds and poured with a resin such as epoxy, polyurethane or polyester resin. Furthermore, silicones or hydraulically setting material systems can also be used. In addition, laminates based on glass or carbon fiber can be produced on the basis of the part surfaces.

After curing of the material systems, demolding is carried out by bringing solvent, preferably water, into contact with the mold. This can be done, for example, by dipping the mold in the solvent or pouring the solvent over the mold. The soluble component now dissolves rapidly, breaking the cohesion of the insoluble powder.

The insoluble component is also flushed out, can be collected, remixed with soluble material and returned to the process. To release the built part, a sufficiently large gap is sufficient from which the insoluble material can flow out together with the solvent.

Several terms according to the invention will be explained in more detail below.

In the sense of the invention, "3D printing methods" are all methods known from the prior art which enable the construction of parts as three-dimensional molds and are compatible with the described process components and devices.

"Selective printing liquid application" in the sense of the invention may be effected after each application of particle material—or of a particle material mixture—or irregularly, i.e. non-linearly and parallel after each particle material application, depending on the requirements for the molded article and for optimization of the molded article production. Thus, "selective printing liquid application" may be adjusted individually, during the course of the molded article production.

"Binders" in the sense of the invention are materials which, by means of dissolution by a solution or solvent, e.g., an aqueous solution, cause solid and insoluble particles, e.g., sands, in a particle material to adhere to each other and produce relative strength between the particles.

A "molded article" or "part" or "mold" or "3D molding" in the sense of the invention means all three-dimensional objects manufactured using the process (3D printing process) according to the invention and exhibiting dimensional stability.

The "particle materials" or "insoluble particle materials" of use herein may be any materials known for powder-based 3D printing (e.g. inkjet process), in particular sands, ceramic powders, metal powders, plastic materials, wood particles, fiber materials, celluloses or/and lactose powders. The particle material is preferably a free-flowing powder when dry, but may also be a cohesive, cut-resistant powder or a particle-charged liquid.

"Particle material" or "particle material mixture" in the sense of the invention refers to a mixture of two or more different materials, e.g., a water-soluble particle material and a water-insoluble particle material, the individual materials being further described in the present disclosure.

A "material system" in the sense of the invention consists of various components which, by their interaction, permit the layer-by-layer construction of moldings; these various components can be applied and deposited together or successively in layers. Individual components such as binder components can be present in one or both material components and these then have an influence on, for example, the strength of the molding produced.

A "printing liquid" in the sense of the invention is used to be selectively applied to the applied particle material mixture and to selectively achieve the formation of a molded article. The printing liquid may contain binder materials, and these binder materials may be present substantially exclusively in the particle material mixture, present substantially exclusively in the printing liquid, or present in both components. A "printing liquid" in the sense of the invention comprises or consists of a liquid selected from the group consisting of water or an aqueous solution and a lignin-containing component or derivatives or modified lignins thereof, preferably lignosulfonate.

The "build area" is the geometric location where the particle material bed grows during the build process by repeated coating with particle material. The build area is generally bounded by a bottom, i.e. the build platform, by walls and an open top surface, i.e. the build plane.

"Casting material" in the sense of this invention means any castable material, in particular those in the processing of which no temperatures occur which could weaken a cold-resin bond and thus favor demolding.

For the purposes of the invention, "porosity" is a labyrinthine structure of cavities created between particles bonded in the 3D printing process.

The "sealing" acts at the geometric boundary between the printed mold and the cavity to be filled. It superficially seals the pores of the porous molded article.

"Cold casting processes" refers, in particular, to casting processes in which the temperature of the mold and core does not reach the decomposition or softening temperature of the mold material before, during and after casting. The strength of the mold is not affected by the casting operation. This would be contrasted with metal casting processes, in which the mold is generally slowly destroyed by the hot casting compound.

The term "treated surface" refers to a surface of the casting mold that is treated in a preferably separate step after printing and cleaning the mold. This treatment is often an application of a substance to the surface and thus into the areas of the mold or core near the surface. For the application all conceivable different procedures come into consideration.

It is economically desirable, especially for more complex shapes, to realize molds for cold casting and laminating molds via 3D printed molds.

One aspect of the present invention is to provide a mold, particularly for use in cold casting and laminating processes, made by a powder-based additive layer manufacturing process, wherein the final mold may optionally have a treated surface and may be weakened and demolded by a solvent.

The treated surface can, for example, prevent castable material systems or liquid binders from penetrating the molded article due to hydrostatic pressure or capillary effects.

Further embodiments or/and aspects of the invention will be presented below.

According to a preferred embodiment, the invention comprises a material system comprising a mixture of a particle material, wherein at least one powder component is soluble in a second liquid component.

In another aspect, the invention relates to a first material component consisting of at least one insoluble inorganic and/or organic particle material and a soluble, preferably water-soluble, polymer having a similar particle size distribution.

In another aspect, the invention relates to a second material component consisting largely of a solvent and additives for adjusting viscosity and surface tension.

Furthermore, the invention relates to the production of water-soluble molds by means of powder bed-based 3D printing in an additive layer manufacturing process and with a liquid component that is selectively introduced into the particle material.

Due to the soluble properties of a component of the particle material, a molded article made from it by 3D printing can be destroyed again under mild conditions by exposure to a solvent, preferably water.

In another aspect, the invention relates to a use of the mold according to the invention for producing cold castings as a lost mold or laminate.

In particular, the casting molds according to the invention can be used to produce concrete castings and/or cold-cast polymer parts.

Preferably, a powder bed-based 3D printing process is used for the additive layer manufacturing process.

If the surface is additionally sealed with a hydrophobic material, if necessary, the penetration of the casting material into the pores of the mold can be well restricted.

Furthermore, it is possible to change the porosity of the surface by a sizing agent and/or dispersion, in particular a zirconium oxide, aluminum oxide, calcium oxide, titanium oxide, chalk or silicic acid-based sizing agent and/or a plastic, cellulose, sugar, flour and/or salt-based solution.

Moreover, the porosity of the surface can be changed or sealed by a grease, oil, wax and/or hot water soluble substances.

EXEMPLARY EMBODIMENTS

A. An exemplary device for producing a molding in accordance with the present invention includes a powder recoater. Particle material is applied onto a build platform and smoothed by the powder recoater. The applied particle material can consist of a wide variety of insoluble materials, but according to the invention, sand mixed with a water-soluble polymer is preferred due to its low cost. The height of the powder layers is determined by the build platform. The build platform is lowered after application of one layer. In the next coating process, the resulting volume is filled and the excess is smoothed down. The result is a substantially or even almost perfectly parallel and smooth layer of a defined height.

After a coating and, if necessary, heating process, a liquid that transfers the soluble polymer to the particle material is printed on the layer using an inkjet print head. The print image corresponds to the section through the part at the current build height of the device. The liquid impacts the particle material and slowly diffuses into it.

The soluble binder physically bonds the surrounding loose insoluble particles together. Initially, the bond is only of low strength.

In the next step, the build platform is lowered by one layer thickness and the layer is also additionally heated by means of heat. The layer-forming, printing/exposure, heating and lowering steps are repeated only until the desired part has been completed.

The part is now completely present in the powder cake. In the final step, the part is freed from loose particle material. In addition, cleaning of loose powder material can follow by means of compressed air.

B. The bonded build volume surrounded by unbonded build volume can be dried faster by sucking air through it.

C. The produced part can then still be dried in the oven to further increase the strength. After treatment of the surface, the part can be used for cold casting or as a laminating mold.

D. Depending on the application purpose and required surface quality, different average particle sizes of insoluble particle material and soluble polymer are used. For high surface qualities, for example, sands and soluble polymer with an average particle diameter of 60 μm-90 μm are used, allowing a very fine layer height of 150 μm to be selected. Coarser particles with e.g. a $d_{50}$=140 μm-250 μm allow only 250 μm-400 μm layer heights. This yields coarser surfaces. The building speed is also influenced by the fineness of the particle material.

Two examples each of a particle material with a soluble component and a liquid material are shown below, together with examples of the properties of resulting parts.

E. Exemplary particle materials:

Example 1

Particle material consisting of sand with an average particle size of 150 μm (95%) and sand with a $d_{50}$ of 190 μm (5%) is mixed in a conical screw mixer for 1 h and then screened (250 μm mesh size).

Example 2

Particle material consisting of softwood fibers (80%, e.g. Lignocel®) and starch powder (20%) are mixed in a conical screw mixer for 1 h and then screened (250 μm mesh size).

F. Exemplary printing liquids

Composition of an Exemplary Printing Liquid (Liquid Component)

While stirring at 300 rpm with a blade mixer, ligno-sulfonate (25%) is added to distilled water (52%) in portions and stirred until the solid is completely dissolved. Then maltodextrin (12%) and glucose (10%) are also added in portions followed by Surfynol (0.8%) and finally Zetasperse 179 (0.2%). After stirring for another hour at 600 rpm, the mixture is filtered (mesh size <1 μm) (the specified quantities refer to 100% of the total mixture).

G. An exemplary printing process

Before the actual printing process, the build platform is covered with a layer of foundry sand with an average particle size of 140 μm and heated to a surface temperature of 90° C. using IR radiation. The layer-by-layer printing process then takes place, with printing liquid being introduced via the print head, in accordance with the build data, in an amount of 15% based on the mass of the particle material.

H. An exemplary post-processing step (optional)

After completion of the print job, negative pressure is applied to the box for 1 h, drawing ambient air through the powder cake and drying the parts. After unpacking and finishing, the parts have a 3-point bending strength of 210 $N/cm^2$ and a residual moisture content of 0.3%. At a maximum relative humidity of 60%, the parts can be stored without deformation.

Figure 1:
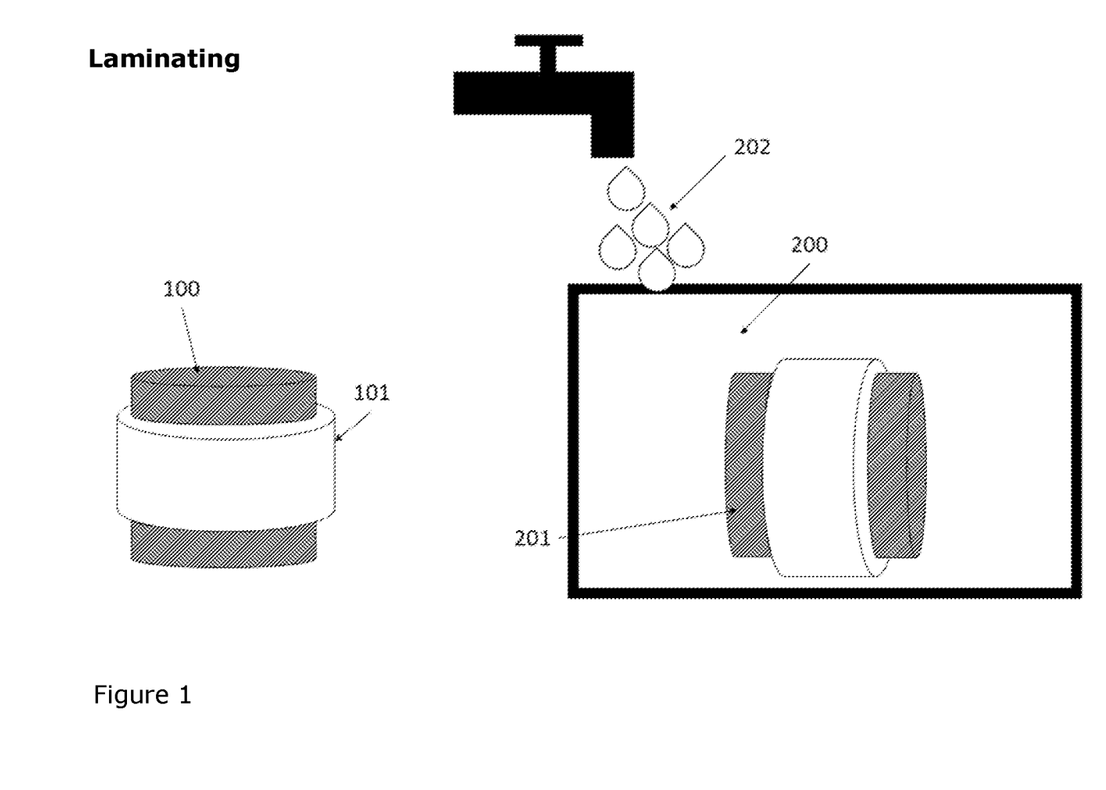
FIG. 1: illustration of a simple printed molding as a laminating mold for a laminate.
Figure 2:
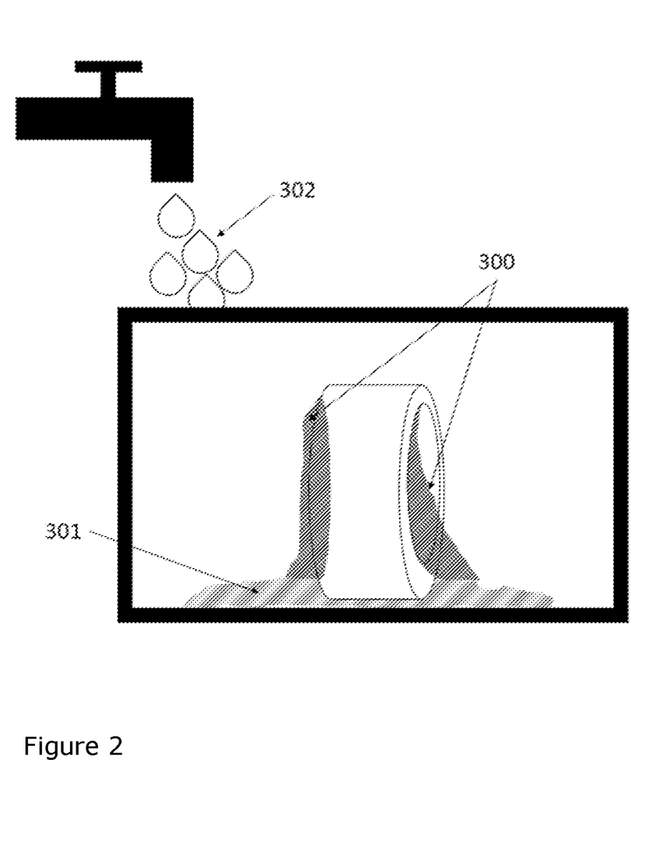
FIG. 2: washing out the laminate while destroying the printed part
Figure 3:
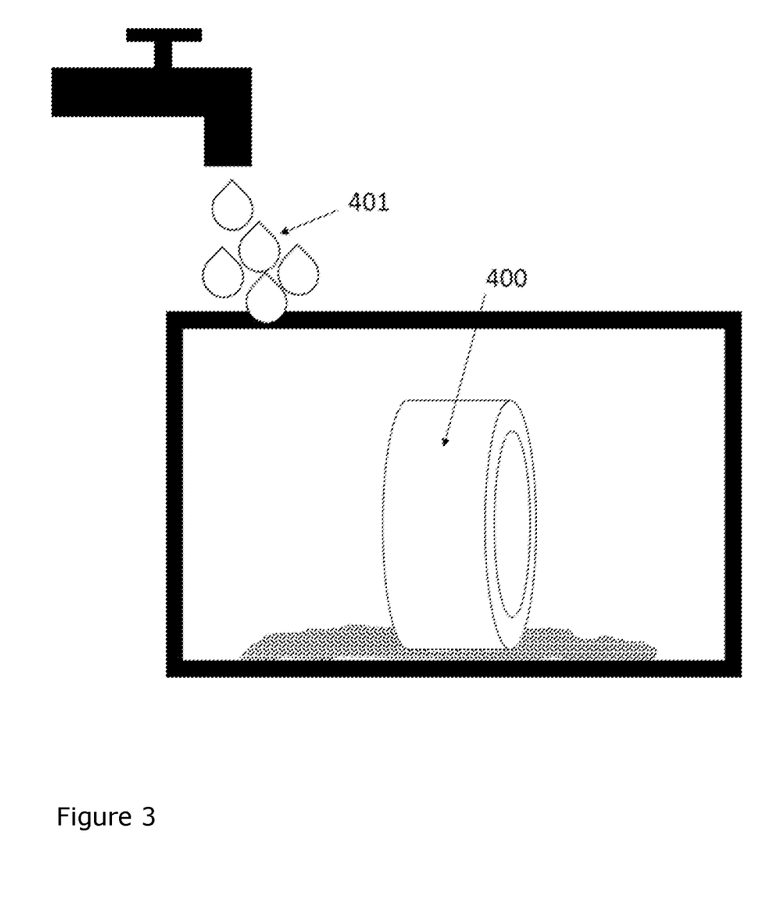
FIG. 3: cored laminate
Figure 4:
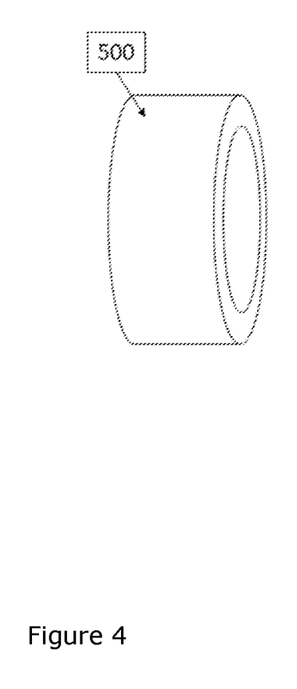
FIG. 4: finished laminate
Figure 5:
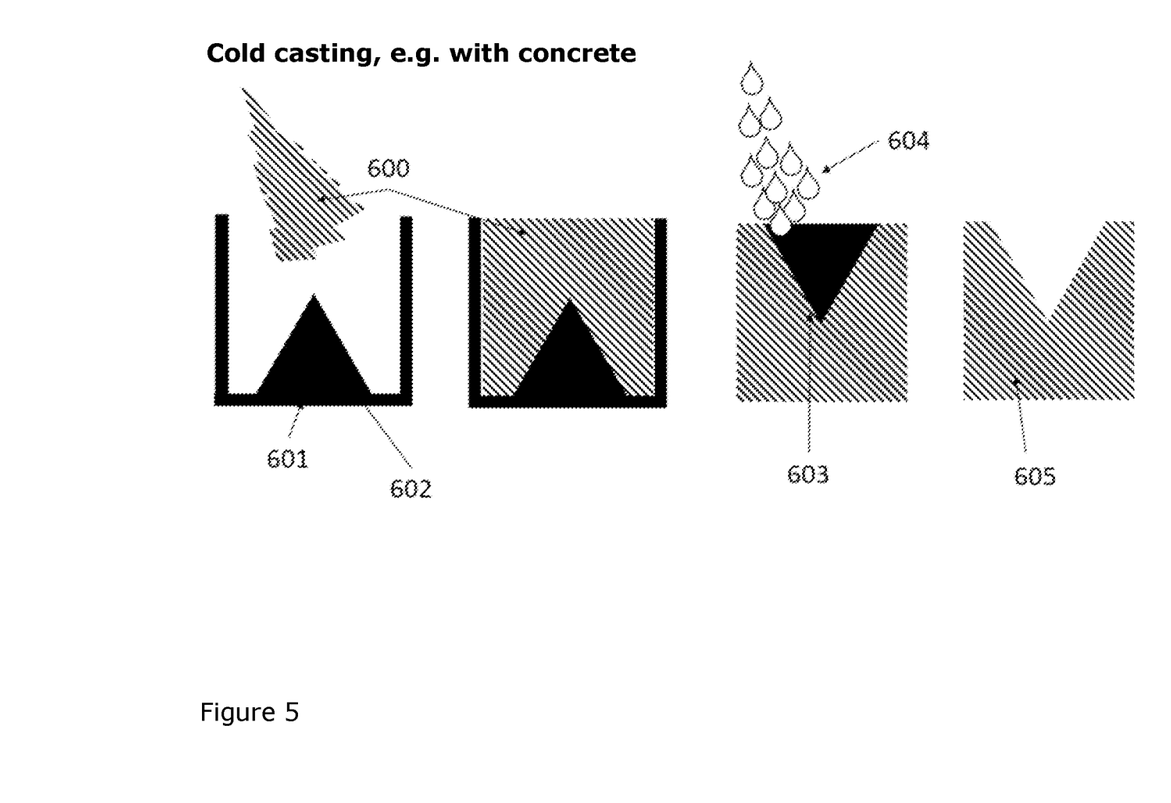
FIG. 5: process sequence for cold casting with subsequent washing out of the mold

Further explanations of the Figures describe various aspects of the invention:

FIG. 1 shows the use of the prepared water-soluble core (100) as a laminating mold with laminate (101) already surrounding it. After the resin has cured, the mold is placed in a water basin (200) and additionally washed out with a water jet (202). FIG. 2 shows the dissolving mold (300). The insoluble component of the particle material (301) collects at the bottom of the water basin. After complete dissolution of the soluble component, the laminate (400) remains and can still be completely cleaned under a water jet (401) (FIG. 3). FIG. 4 shows the cleaned and dried laminate. FIG. 5 shows the application in cold casting. First, the water-soluble mold (602) is placed in a mold (601). The material to be cast, e.g. epoxy resin or concrete (600), is poured into the mold. After the casting material has cured, usually after 24 h, the core is again demolded under mild conditions by means of a dip tank and/or water jet (604). The remaining insoluble material can be reintroduced into the printing process after drying and mixing with the soluble portion. As a result, the process achieves a high level of cost-effectiveness, which is a great advantage, especially when using special sands.

LIST OF REFERENCE NUMERALS 100 water-soluble core
101 laminate surrounding the water-soluble core
200 water basin
201 water-soluble core with laminate
202 water
300 core dissolves
301 insoluble particle material
302 water
400 cored laminate
401 water
500 finished laminate
600 concrete
601 formwork
602 water-soluble core 603 washing out with water
604 water
605 cored concrete part

The invention claimed is:

1. A material system suitable for a 3D printing process or a 3D printing process material system comprising or consisting of:
a particle material and a printing liquid,
wherein the particle material includes an inorganic particle material or organic particle material,
wherein the printing liquid comprises or consists of:
i) a liquid component selected from the group consisting of water and an aqueous solution; and
ii) a lignin-containing component or derivatives thereof wherein the lignin content in the printing liquid is 10 to 35 percent.

2. The material system according to claim 1, wherein the liquid component comprises polar organic or/and inorganic liquids,
wherein the printing liquid has a viscosity of 2 mPas-20 mPas.

3. The material system according to claim 2, wherein
the printing liquid further comprises a surfactant, and has a surface tension of 20 mN/m-50 mN/m, or/and comprises defoaming agents, or/and
wherein the printing liquid contains further rheological and dispersing additives which improve the wetting of the components used, and corrosion inhibitors.

4. The material system according to claim 1, wherein the particle material includes the organic particle material.

5. The material system of claim 4, wherein the material system additionally contains a soluble starch hydrolysate, wherein
the dextrose equivalent of the starch hydrolysate is between 1 and 50;
wherein an alcohol content is between 0.5%-15%, the alcohols comprise simple alcohols, diols or polyols or mixtures of the above; and
the printing liquid has a viscosity of 2 mPas-20 mPas.

6. The material system according to claim 5, wherein
the printing liquid further comprises a surfactant; and
the printing liquid has a surface tension of 20 mN/m to 50 mN/m; and
the printing liquid comprises a defoaming agent; and
the printing liquid comprises a rheological and dispersing additives which improve the wetting of the components used.

7. A 3D printing process comprising the steps of:
applying a particle material mixture onto a build plane,
selectively applying a printing liquid, wherein the printing liquid comprises:
i) a liquid selected from the group consisting of water and an aqueous solution; and
ii) a lignin-containing component or derivatives thereof, preferably lignosulfonate, for at least partial selective solidification,
and
repeating these steps until a desired part has been obtained;
wherein the lignin content in the printing liquid is 10 to 35 percent;
optionally wherein the part is a molding.

8. The 3D printing process according to claim 7, wherein the obtained molding is separated from the non-solidified particle material mixture and the molding is subjected to a further heat treatment step and/or a treatment with microwave radiation.

9. The 3D printing process of claim 8, wherein
the process comprises the step of tempering the build field or introducing energy into the applied particle material mixture, to 30° C. to 60° C.; and
the molding is subjected to a further heat treatment step and/or a treatment with microwave radiation.

10. The 3D printing process of claim 8, wherein the particle material mixture is applied by means of a recoater,
the printing liquid is selectively applied with a print head, and
the molding is left in a powder bed at ambient conditions for 4 h-24 h, after completion of the printing process.

11. The 3D printing process of claim 10, wherein the molding is dried and/or cured by sucking a gas or gas mixture, preferably ambient air, through the entirety of non-printed and printed areas after completion of the printing process, wherein suction preferably takes place 0.5 to 2 hours after the end of printing,
the molding has a strength of 150 N/cm$^2$ to 200 N/cm$^2$;
the process includes an additional step of:
i) subjecting the molding to a heat treatment for 0.5 to 7 hours at 30° C.-160° C., by means of an IR lamp, or
ii) subjecting the molding to a treatment with microwave radiation, the treatment taking place over a period of 2 to 30 minutes.

12. The 3D printing process of claim 11, wherein the lignin-containing component includes lignosulfonate; and
the method comprises the step of tempering the build field or introducing energy into the applied particle material mixture, to 30° C. to 60° C.

13. The 3D printing process according to claim 7, wherein the particle material mixture is applied by means of a recoater, or/and
wherein the printing liquid is selectively applied with a print head, or/and
wherein the molding is left in a powder bed at ambient conditions for 4 h-24 h, after completion of the printing process.

14. The 3D printing process according to claim 7, wherein the molding is dried and/or cured by sucking a gas or gas mixture, through the entirety of non-printed and printed areas after completion of the printing process, wherein suction preferably takes place 0 h-24 h, after the end of printing, or/and
wherein in an additional step the molding is subjected to a heat treatment, wherein the molding is stored 0.5 h 7 h at 50° C.-140° C., or
wherein, in an additional step, the molding is subjected to a treatment with microwave radiation, the treatment taking place over a period of 2 min-30 min.

15. The 3D printing process according to claim 7, wherein the surface of the molding is further coated or sealed.

16. The 3D printing process of claim 15, wherein the lignin-containing component includes lignosulfonate; and
the method comprises the step of tempering the build field or introducing energy into the applied particle material mixture, to 30° C. to 60° C.

17. The 3D printing process according to claim 7, with a material system comprising:
the particle material mixture and the printing liquid,
wherein the particulate material mixture includes a particle material selected from the group consisting of quartz sand, olivine sand, kerphalite, cerabeads, ceramics, and metal powder,
wherein the particle material is untreated, wherein the printing liquid comprises:
  i) a liquid component selected from the group consisting of water and an aqueous solution; and
  ii) a lignin-containing component including lignosulfonate.

18. The 3D printing process of claim 7, wherein particle material includes an organic particle material.

19. The method of claim 7, wherein the method comprises a step of:
  cold casting of a synthetic resin with the molding; or
  casting of a hydraulically setting system with the molding; or
  laminating with the molding.

20. A molding produced by a 3D printing process according to claim 7, wherein the molding, left in the powder bed at ambient conditions for 4 h-24 h, has strengths of 80 $N/cm^2$-150 $N/cm^2$ in the direction of printing and, after heat treatment for 1 h-7 h, at 30° C. 160° C. has strengths of more than 200 $N/cm^2$.

21. A material system suitable for a 3D printing process or a 3D printing process material system comprising or consisting of:
  a particle material and a printing liquid,
  wherein the particle material includes an inorganic particle material,
  wherein the printing liquid comprises:
  i) a liquid component selected from the group consisting of water and an aqueous solution;
  ii) a lignin-containing component or derivatives thereof; and
  iii) a soluble starch hydrolysate, an alcohol, or a defoaming agent.

* * * * *